United States Patent
Comparetti

(10) Patent No.: US 6,571,401 B2
(45) Date of Patent: Jun. 3, 2003

(54) FLUSH AND TAP TOILET WATER SAVER SYSTEM

(76) Inventor: Joseph Jack Comparetti, 23 Cedargrove, Lake Grove, NY (US) 11755-2969

( * ) Notice: Subject to any disclaimer, the term of this patent is extended or adjusted under 35 U.S.C. 154(b) by 0 days.

(21) Appl. No.: 09/683,484

(22) Filed: Jan. 7, 2002

(65) Prior Publication Data

US 2002/0133868 A1 Sep. 26, 2002

Related U.S. Application Data

(60) Provisional application No. 60/278,326, filed on Mar. 26, 2001.

(51) Int. Cl.$^7$ ................................................. E03D 1/35
(52) U.S. Cl. ........................ 4/404; 4/393; 4/366; 4/325
(58) Field of Search ............................ 4/404, 403, 395, 4/392, 388, 366, 324, 384, 382, 381, 379, 325

(56) References Cited

U.S. PATENT DOCUMENTS

| | | | | |
|---|---|---|---|---|
| 3,733,618 A | * | 5/1973 | Wiegand | 4/393 |
| 4,593,419 A | * | 6/1986 | Derus | 4/324 |
| 5,181,282 A | * | 1/1993 | Comparetti | 4/404 |
| 5,400,444 A | * | 3/1995 | Boyer et al. | 4/325 |
| 5,966,749 A | * | 10/1999 | Goesling et al. | 4/392 |
| 6,263,520 B1 | * | 7/2001 | Song | 4/325 |

* cited by examiner

Primary Examiner—Timothy L. Maust
Assistant Examiner—Huyen Le

(57) ABSTRACT

A flush and tap toilet water saver system is provided for use in the modern 1.6 gallon toilets that can utilize a flapper valve, a water supply valve which is controlled by a float ball, and a conventional operating handle. A main flapper valve has a bleeder valve installed thereon. The operating handle is rotated normally to open the main flapper valve and simultaneously open the bleeder valve thereby venting air from the main flapper valve and causing it to lose buoyancy and close sooner thus allowing only an abbreviated flush cycle in the toilet tank. When the operating handle is first pushed and then quickly tapped, the tap doses the bleeder valve and cuts off the venting air which causes the flapper valve to maintain full buoyancy and only close when the valve pusher mechanism rotates a valve pusher to force the flapper valve closed just when 1.6 gallons of water is released.

2 Claims, 3 Drawing Sheets

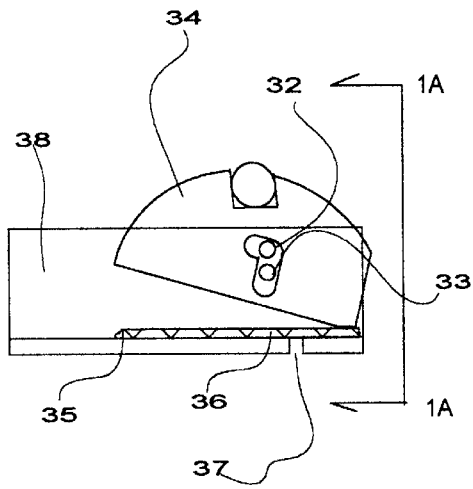
Fig. 3a
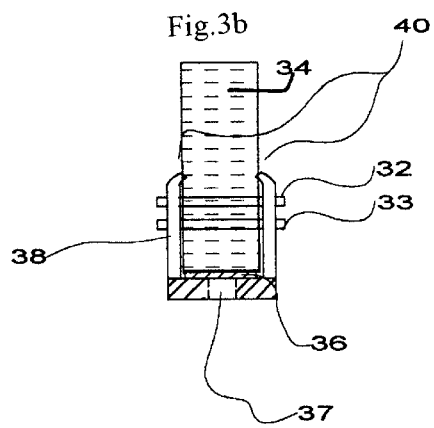
Fig.3e
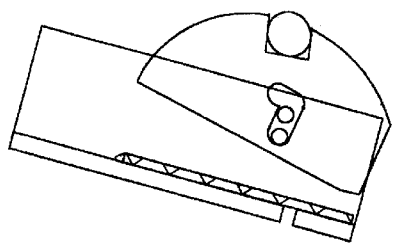
Fig.3c
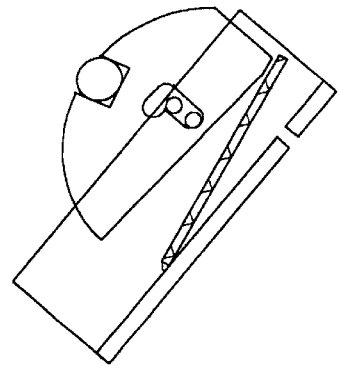
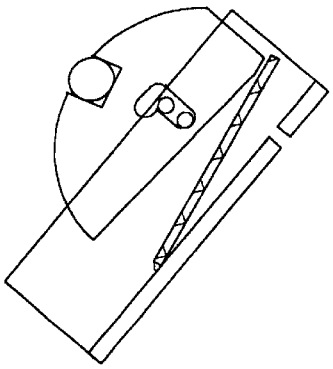
Fig.3f
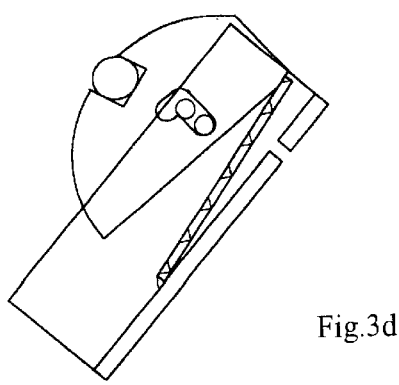
Fig.3d
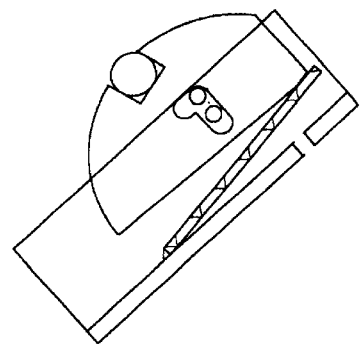

FLUSH AND TAP TOILET WATER SAVER SYSTEM

CROSS REFERENCE TO RELATED APPLICATIONS

The current invention is a variation on the invention U.S. Pat. No. 5,181,282 awarded to Joseph Comparetti. It is designed with operational and manufacturing improvements. The current invention is protected until March 2001 by Provisional Patent No. 60/278,326.

BACKGROUND OF INVENTION

There have been many inventions designed to save water in the toilet flush systems but Flush and Tap Toilet Water Saver System is designed specifically for the modem 1.6 gallon water saving toilets. Although the modem low flush toilets use less water to flush waste, they still do not recognize the fact that less water is needed to flush liquid waste than to flush solid waste. They use the same amount of water for all flushes. This invention addresses that problem by providing dual flush capability in those toilets. It is comprised of flapper valve with an air bleed valve installed thereon. Said bleeder valve releases air from the flapper valve to decrease its buoyancy and cause it to close prematurely when just enough water is flushed to dear liquid waste. The flapper valve operates in conjunction with a second mechanism which is designed to close the flapper valve just when 1.6 gallons of water is released. This system thus provides a dual flush capability in these modern toilets.

SUMMARY OF INVENTION

A primary object of this invention is to provide a flush and tap toilet water saver system that will allow the user certain options that were not available in modern 1.6 gallon water saver toilets.

An additional object is to provide a flush and tap toilet water saver system that utilizes a bleeder valve installed onto the flapper valve which responds to the manner in which the operating handle is actuated by opening when the handle is pressed normally and closing when the handle is tapped after having been ressed normally.

Another object is to provide a flush and tap flapper valve that allows the option to the user to select the amount of water that will be flushed into the toilet whereby pressing the flush handle once results in a lesser water flush but pressing the flush handle once and then quickly tapping it results in a full 1.6 gallon flush.

Another object is to provide a flush and tap toilet water saver system that includes a means of closing the flapper valve when 1.6 gallons of water is released. This is needed because after the operating handle is tapped, the flapper valve retains buoyancy and would otherwise only close when the more than 3 gallons of water evacuates the water closet.

Another object is to provide a flush and tap toilet water saver system with which existing modem 1.6 gallon water saving toilets can be retrofitted thereby saving even more water in those toilets.

Another object is to provide a flush and tap toilet water saver system that is easy to manufacture and install and with little cost.

Another object is to provide a flush and tap toilet water saving system that can be can be installed in newly manufactured water saver 1.6 gallon toilets to save an additional 3 gallons of water on every 5 flushes of those toilets.

The following drawings will illustrate the above objects however the drawings are illustrative only and the specific construction may be changed without changing the objects or claims of the invention.

BRIEF DESCRIPTION OF DRAWINGS

FIG. 3a is an enlarged diagrammatic cross sectional view of the bleeder valve alone as shown in FIG. 2 with the tripper 34 in dosed position.

FIG. 3b is a diagrammatic cross sectional view of FIG. 3a taken on line 1A—1A of FIG. 3a.

FIGS. 3c, 3d, 3e, and 3f are four active positions of the bleeder valve shown with the flapper valve removed.

DETAILED DESCRIPTION

Figure 1:
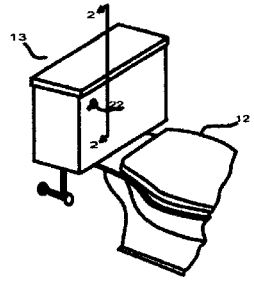
FIG. 1 is a diagrammatic perspective view of a toilet water closet having the current invention installed therein.
Figure 2:
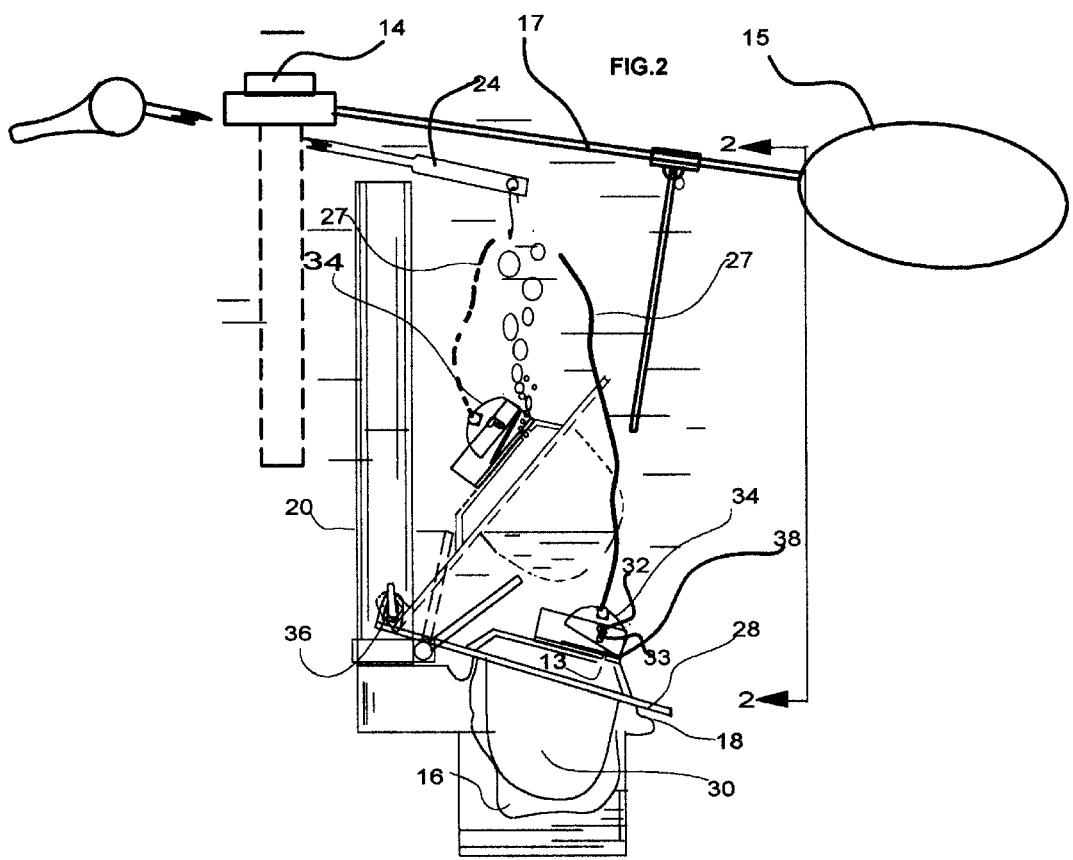
FIG. 2 is a diagrammatic cross sectional view of the flush and tap flapper valve and overflow tube taken on line 2—2 of FIG. 1 with the flapper valve in the dosed position on the valve seat with the bleeder valve closed and also with a ghost representation of the flapper valve in the opened position showing the bleeder valve opened. Shown behind the Flapper valve is the valve pusher arm with its linkage not shown in order to maintain clarity.

In the description of the drawings, similar reference characters will denote similar elements throughout the several views, the FIGS. 1 and 2 illustrate a flush and tap water saver system designed for use in a modem water saving toilet of the type having a water closet 13, a flush port 16, a valve seat 18, an overflow tube 20, and a water supply valve 14 to turn the water on when the float ball 15 and rod 17 lowers and off when the water closet is full. The apparatus consists of an operating handle 22 mounted to the toilet tank so that when the operating handle is pressed down the lever 24 rotates up. Looking at FIG. 2, the lever 24, by means of a pull cord 27, is attached to the tripper 34 of an air bleeder valve 38 which is installed on the main flapper valve 28. Tripper 34 is the dosing member of the bleeder valve which reacts to the manner in which the operating handle is pressed. The main flapper valve 28 has a chamber 30 for holding air therein. The main flapper valve 28 Is pivotally mounted at one end 26 to the overflow tube 20, so as to be able to rotate upward from the normal position sitting upon the valve seat 18 over the flush port 16. The air bleeder valve 38 has an opening 37 in its base which is covered by a thin plastic membrane 36. The plastic membrane 36 is attached to the base at point 35 and is free to pivot up easily under pressure of air escaping the air chamber 30 but will otherwise lie flat on the base covering the opening 37.

Looking at FIGS. 3a and 3b, tripper 34 has an inverted L shaped slot which allows it to move freely on the pins 32 and 33 which are firmly inserted into the housing walls of the bleeder valve 38. It is shown in the closed position with the thin plastic membrane 36 covering the opening 37 to the flapper valve air chamber 30. In FIG. 3c when the operating handle 22 is pressed, the cord 27, represented by the heavy arrow, pulls the tripper 34 up and, riding on the pins 32 and 33, it will move up to the position shown in FIG. 3c and at the same time the main flapper valve will be pulled up off the valve seat . Looking at FIG. 3d, at the top of the rotation of the flapper valve the tripper 34 is prevented from closing down by the engagement of the pins 32 and 33 in the inverted L shaped slot. The thin plastic membrane 36 is now pushed and held open by the pressure of the air escaping from the air chamber. FIG. 3e shows the tripper 34 in the position it takes just after the operating handle is momentarily released. The vibration along with gravity causes it to fall and hang on pin 32 at an angle allowing the thin plastic membrane 36 to remain open. If the handle is not tapped the flapper valve will lose all buoyancy and dose prematurely when just enough water is released to clear liquid waste. If however the operating handle is now tapped, the tripper will be caused to rotate forward to the position shown in figure 3f. The thin plastic membrane 36 will now dose the bleeder valve opening 37 and cut off the venting of air from the air chamber 30. The tripper will be held in that position by being wedged between the ridges 40 shown in FIG. 3b. The result will be that the main flapper valve 28 will maintain buoyancy and will remain open until the valve pusher 46, shown in FIG. 2 and FIG. 4, rotates forward to push it closed.

Figure 4:
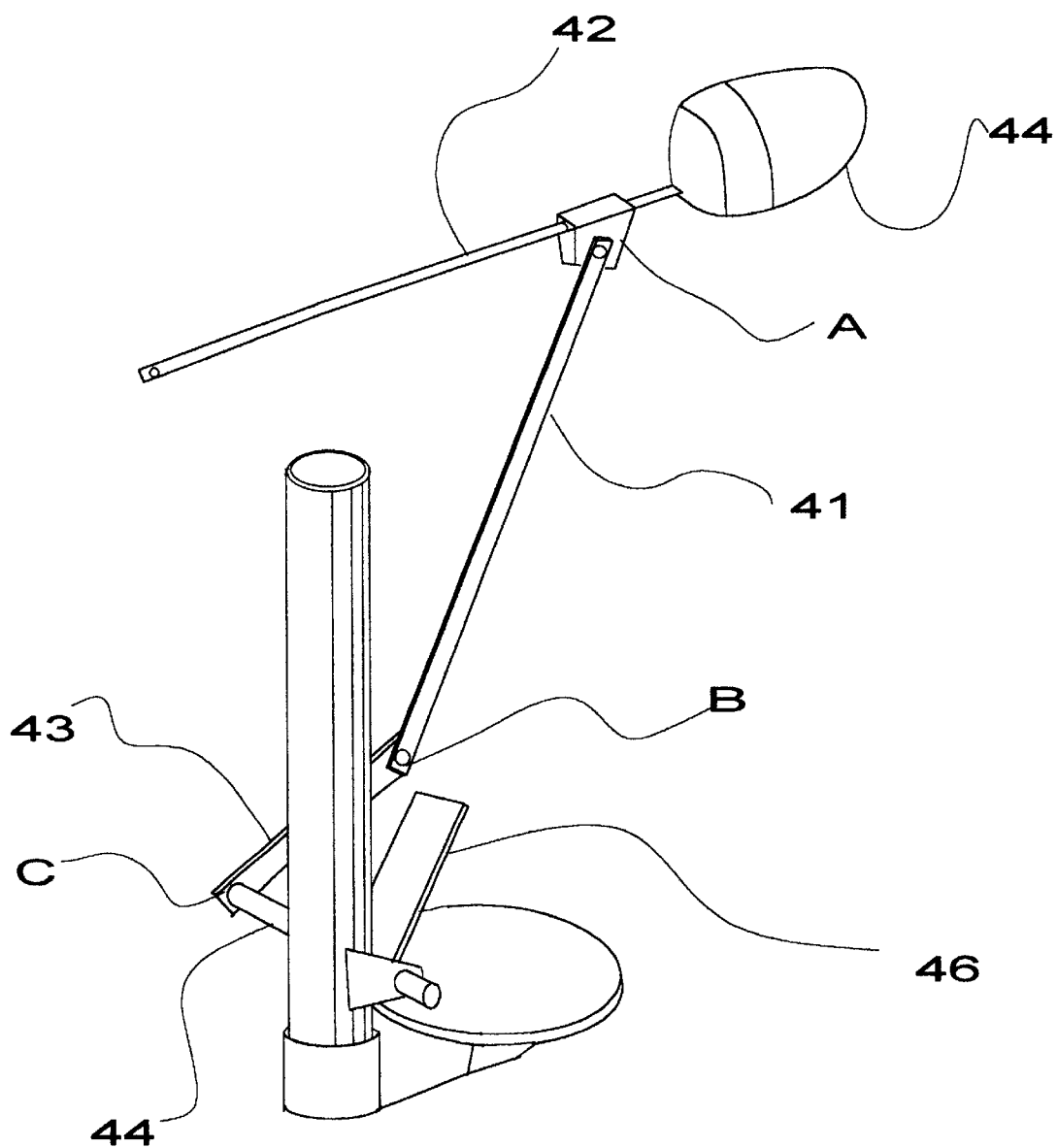
FIG. 4 is a 3D depiction of the linkage mechanism required in modem 1.6 gallon toilets to dose the flapper valve when 1.6 gallons is released.

FIG. 4 shows the mechanism required to close the flapper valve when 1.6 gallons of water is released. Looking at FIG. 4, float ball 44 has arm 42 pivotally connected to its shaft 41 at point A. Arm 42 is pivotally connected to arm 43 at point B. Arm 43 is solidly connected to rod 44 at point C. Rod 44 is secured to the overflow tube at its base by bracket D such that it can rotate within said bracket D. Set into rod 44 is valve pusher 46 which is positioned just behind and not attached to the flapper valve.

When the operating handle 22 is pushed, momentarily released and then tapped, the flapper valve maintains full buoyancy and the water in the water closet starts to lower. The float ball 40 lowers and through the linkage 42, 43, and 44 the valve pusher 46 rotates downward and pushes flapper valve closed. The linkage is adjusted so that the flapper valve will close just when 1.6 gallons has been released.

While certain novel features of this invention have been shown and described in the attached claims it will be understood that various omissions, substitutions and changes in the forms and details of the device illustrated and in its operation can be made by those skilled in the art without departing from the spirit of the invention.

What is claimed is:

1. A flush and tap toilet water saver system for use in the modern water saver toilets of the type having a water closet and can utilize a flapper valve, an overflow tube with a valve seat and a water supply valve controlled by a float ball, said system comprised of:

a) a conventional operating handle mounted to the water closet, connected to a lever extending out over the flapper valve so that the operating handle can rotate the lever when pushed;

b) a main flapper valve pivotally mounted at the base of the overflow tube so as to normally sit upon the valve seat over a flush port and having an air chamber for holding air therein;

c) said flapper valve having an air bleeder valve installed thereon for evacuating air from the air chamber when said bleeder valve is opened;

d) said bleeder valve having a tripper coupled by a cord to the operating handle lever such that when the operating handle is pushed, the main flapper valve is pulled up while simultaneously rotating said tripper to uncover an air release hole and thus venting air from the air chamber of said main flapper valve in order to cause the flapper valve to lose buoyancy;

e) said tripper, interacting with pins set into walls of said bleeder valve such that when the operating handle is pressed, then momentarily released and then trapped, rotating forward to close off escaping air from the flapper valve and thus maintaining its full buoyancy.

2. A flush and tap toilet water saver system of claim 1 having a flapper valve which, having had its full buoyancy maintained by the tapping of the operating handle, works in conjunction with a valve closing mechanism comprised of a linkage controlled by the lowering of the float ball arm as the water level in the tank lowers to activate a valve pusher to close the flapper valve when just enough water is released.

\* \* \* \* \*